United States Patent
Ibe et al.

(10) Patent No.: US 6,564,441 B2
(45) Date of Patent: May 20, 2003

(54) METHOD AND APPARATUS FOR MANUFACTURING WIPER LEVERS

(75) Inventors: Hiromitsu Ibe, Kosai (JP); Masataka Kurusu, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 183 days.

(21) Appl. No.: 09/769,757

(22) Filed: Jan. 26, 2001

(65) Prior Publication Data

US 2001/0022018 A1 Sep. 20, 2001

(30) Foreign Application Priority Data

Feb. 2, 2000 (JP) ......................................... 2000-025190

(51) Int. Cl.[7] ............................. B05D 1/04; B05D 1/18
(52) U.S. Cl. ..................... 29/527.2; 29/412; 29/418; 29/423; 29/897.2; 427/458; 427/430.1
(58) Field of Search ...................... 29/423, 412, 418, 29/527.2, 897.2; 427/290, 458, 430.1; 118/428, 501, 423; 15/250.43, 250.44, 250.451, 250.453

(56) References Cited

U.S. PATENT DOCUMENTS

| | | | | |
|---|---|---|---|---|
| 4,031,270 A | * | 6/1977 | Barnes | ........................ 427/462 |
| 5,032,421 A | * | 7/1991 | Sarma et al. | ................. 427/535 |
| 5,078,928 A | * | 1/1992 | Balster et al. | ............... 118/501 |
| 5,169,673 A | * | 12/1992 | Demeney et al. | ............ 427/477 |
| 5,862,579 A | * | 1/1999 | Blumberg | ..................... 29/412 |
| 2002/0015798 A1 | * | 2/2002 | DeWent | ....................... 427/458 |

FOREIGN PATENT DOCUMENTS

JP          9-118200         5/1997

* cited by examiner

Primary Examiner—Gregory Vidovich
Assistant Examiner—Marc Jimenez
(74) Attorney, Agent, or Firm—Posz & Bethards, PLC

(57) ABSTRACT

A wiper blade includes a lever assembly that has several types of levers. The levers of each type are efficiently manufactured in the following manner. First, a lever unit, which has a frame bar and several levers integrated with the frame bar, is pressed. Each lever has a hole. Then, a wire is fed through the holes of the levers. The frame bar is separated from the levers to form a hanging unit, which includes the wire and the levers hanging from the wire. In this state, the lever is coated with paint. After the paint is dried, the wire is removed form the levers.

17 Claims, 10 Drawing Sheets

Moving direction

Moving direction

Moving direction

Moving direction

METHOD AND APPARATUS FOR MANUFACTURING WIPER LEVERS

BACKGROUND OF THE INVENTION

The present invention relates to a method and an apparatus for simultaneously coating a number of parts that form a hanging unit.

Japanese Unexamined Patent Publication No. 9-118200 discloses an apparatus that automatically presses a number of wiper levers, forms a hanging unit of the levers and coats the levers in the hanging unit.

In the pressing step, a pressing device presses a plate to form an integral lever unit having a number of wiper blades, coupling loops and two frame bars. Each lever has sleeves for holding a rubber blade at the ends. Each sleeve has a rectangular cross section. The coupling loops extend from one of the frame bars. Each loop is coupled to an end of the corresponding lever by a tab. The other ends of the levers are coupled to the other frame bar by tabs.

In a subsequent step, the tabs are cut by a tab cutting device, which separates the levers from the frames. The separated levers are held by a lever holding device. The coupling loops, which extend from one of the frame bars, are twisted by a twisting device. Then, a coupling device inserts the coupler loops into the corresponding sleeves of the levers. As a result, a hanging unit, in which the levers are hung from the frame bar having the coupling loops, is formed.

Thereafter, the levers in the hanging unit are simultaneously coated. Then, the levers are detached from the coupling loops of the frame bar. Unlike prior procedures, in which hanging unit of levers are manually assembled, the apparatus of the publication automatically forms hanging units of levers, which improves efficiency.

However, in the hanging unit forming step, the levers are separated from the frame bars. Then, the levers are temporarily held by the lever holding device. Thereafter, one of the sleeves of each lever is fitted to one of the coupling loops of one of the frame bars. Thus, there is significant inefficiency in the process.

Further, the hanging unit is formed by fitting each coupling loop into one of the sleeves of the corresponding lever. In other words, the levers are prevented from falling only by friction between the coupling loop and the sleeves. Thus, when the hanging unit is carried or coated, the levers may fall off the frame bar.

SUMMARY OF THE INVENTION

Accordingly, it is an objective of the present invention to provide a method and an apparatus for manufacturing wiper levers that prevent levers from falling off a frame bar and improve the efficiency of the manufacture.

To achieve the foregoing and other objectives and in accordance with the purpose of the present invention, a method for manufacturing levers used in lever assemblies of wiper blades is provided. The method includes forming a lever unit, wherein the lever unit includes a coupler frame and a plurality of parallel levers integrated with the coupler frame and each lever has a hole, feeding a wire through the holes of the levers, separating the coupler frame from the levers for forming a hanging unit that includes the wire and the levers hanging from the wire, coating the hanging levers with paint and removing the wire from the levers after the paint is dried.

The present invention also provides a method for manufacturing parts. The method includes forming a unit of parts, wherein the unit includes a coupler frame and a plurality of parallel parts integrated with the coupler frame and each part has a hole, feeding a wire through the holes of the parts, separating the coupler frame from the parts for forming a hanging unit that includes the wire and the parts hanging from the wire, coating the hanging parts with paint and removing the wire from the parts after the paint is dried.

Further, the present invention provides an apparatus for manufacturing parts. The apparatus includes a forming station, a wire feeding station, a separating station, a coating station and a removing station. The forming station forms a unit of parts. The unit includes a coupler frame and a plurality of parallel parts integrated with the coupler frame. Each part has a hole. The wire feeding station feeds a wire through the holes of the parts. The separating station separates the coupler frame from the parts for forming a hanging unit that includes the wire and the parts hanging from the wire. The coating station coats the hanging parts with paint. The removing station removes the wire from the parts after the paint is dried.

The present invention also provides an apparatus for forming a hanging unit that includes a wire and a plurality of parts hanging from the wire. Prior to forming the hanging unit, a unit that includes a coupler frame and the parallel parts integrated with the coupler frame is prepared. Each part has a hole. The apparatus includes a wire feeding device, a spacer forming device and a separating device. The wire feeding device feeds a wire through the holes of the parts. The spacer forming device for forming a spacer with the wire between each adjacent pair of the parts. Each spacer prevents the parts of the corresponding pair from contacting one another. The separating device separates the coupler frame from the parts for forming the hanging unit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11A is an enlarged view of a part of FIG. 11; and

DETAILED DESCRIPTION OF THE PREFERRED EMBODIMENTS

One embodiment of the present invention will now be described with reference to the drawings.

Figure 1:
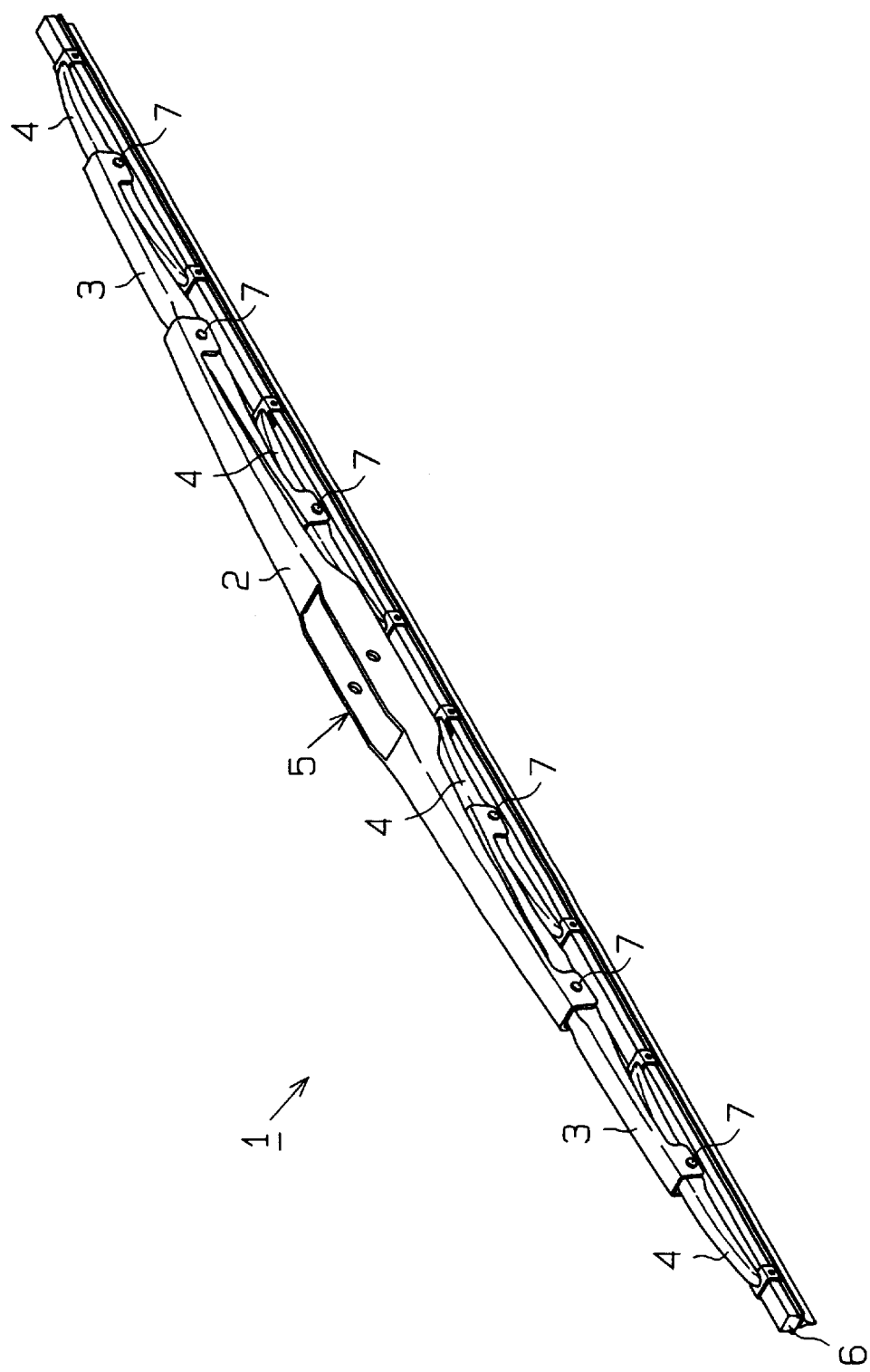
FIG. 1 is a perspective view illustrating a wiper blade according to one embodiment of the present invention.
Figure 2:
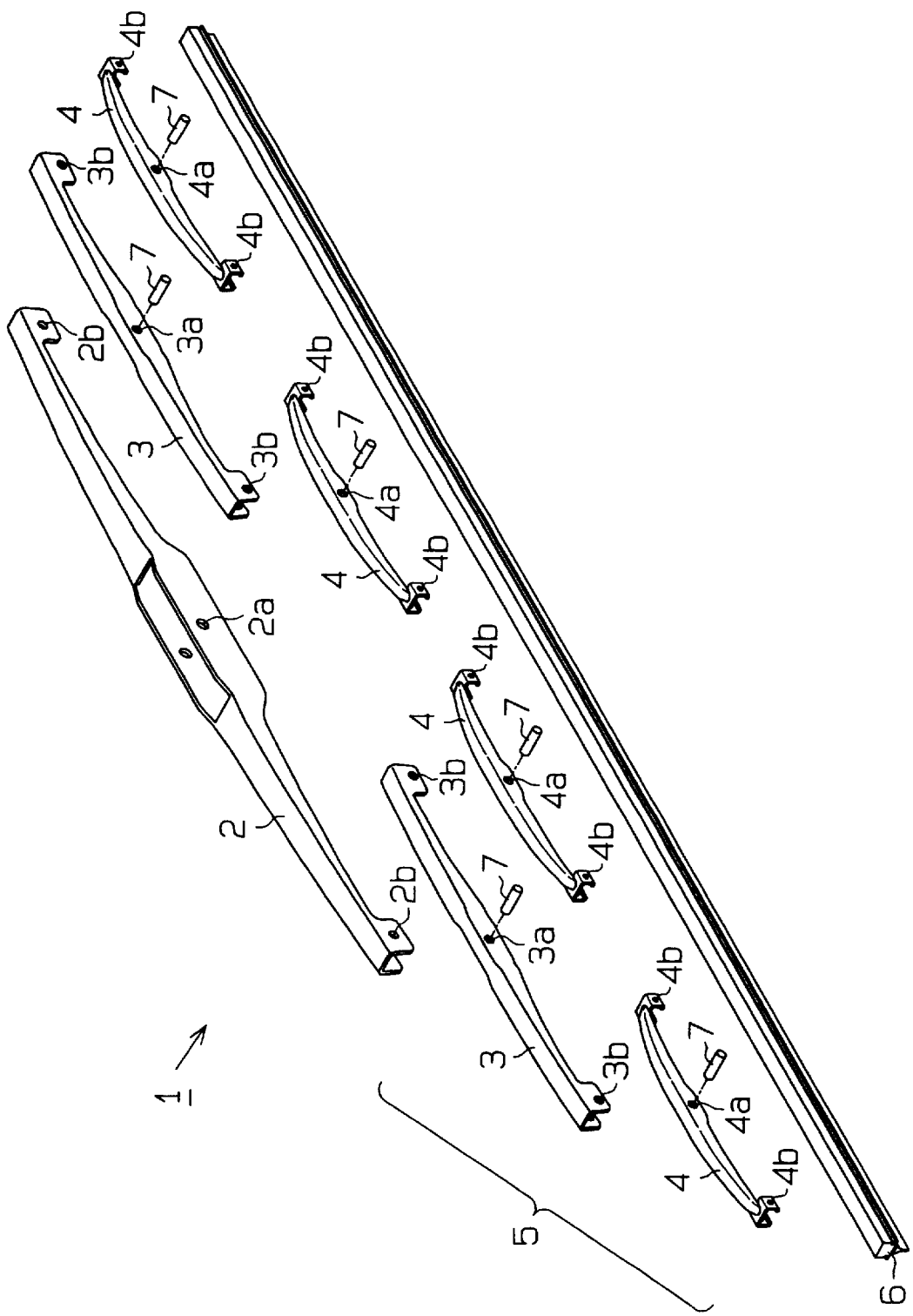
FIG. 2 is an exploded perspective view illustrating the wiper blade of FIG. 1.

As shown in FIGS. 1 and 2, a wiper blade 1 includes a lever assembly 5 and a rubber blade 6. The lever assembly 5 has a "tournament" style structure, which includes a primary lever 2, two secondary levers 3 and four yoke levers 4. The rubber blade 6 is supported by the lever assembly 5 and wipes the surface of a windshield.

The primary lever 2 has primary pivot holes 2a at the center. The primary lever 2 is pivotally coupled to a wiper arm (not shown) by inserting a primary pin or rivet (not shown) through the primary pivot holes 2a.

Primary pivot holes 2b are formed in the ends of the primary lever 2. Secondary pivot holes 3a are formed in the center of each secondary lever 3. Each secondary lever 3 is pivotally coupled to the primary lever 2 by inserting a rivet 7 through the primary pivot holes 2b and the secondary pivot holes 3a.

Secondary pivot holes 3b are formed in the ends of each secondary lever 3. Yoke pivot holes 4a are formed in the center of each yoke lever 4. Each yoke lever 4 is pivotally coupled to the corresponding secondary lever 3 by inserting a rivet 7 through the secondary pivot holes 3b and the yoke pivot holes 4a.

Each yoke lever 4 has sleeves at both ends to hold the rubber blade 6. Each sleeve has a substantially U-shaped cross section. Sleeve holes 4b are formed in each sleeve. The sleeve holes 4b are used in a hanging unit forming step and a coating step, which will be discussed below.

The lever assembly 5 is coated with an antirust and antiglare material prior to assembling the levers 2, 3, 4. That is, the levers 2, 3, 4 are separately coated and thereafter are assembled to form the lever assembly 5.

The manufacture of the lever assembly 5 will now be described. The manufacture includes a pressing step for pressing the levers 2, 3, and 4, a hanging unit forming step, a coating step and an assembling step. Since the pressing step, the hanging unit forming step and the coating step are common to all the levers 2, 3, and 4, only the steps for the yoke levers 4 will be discussed below.

Figure 3:
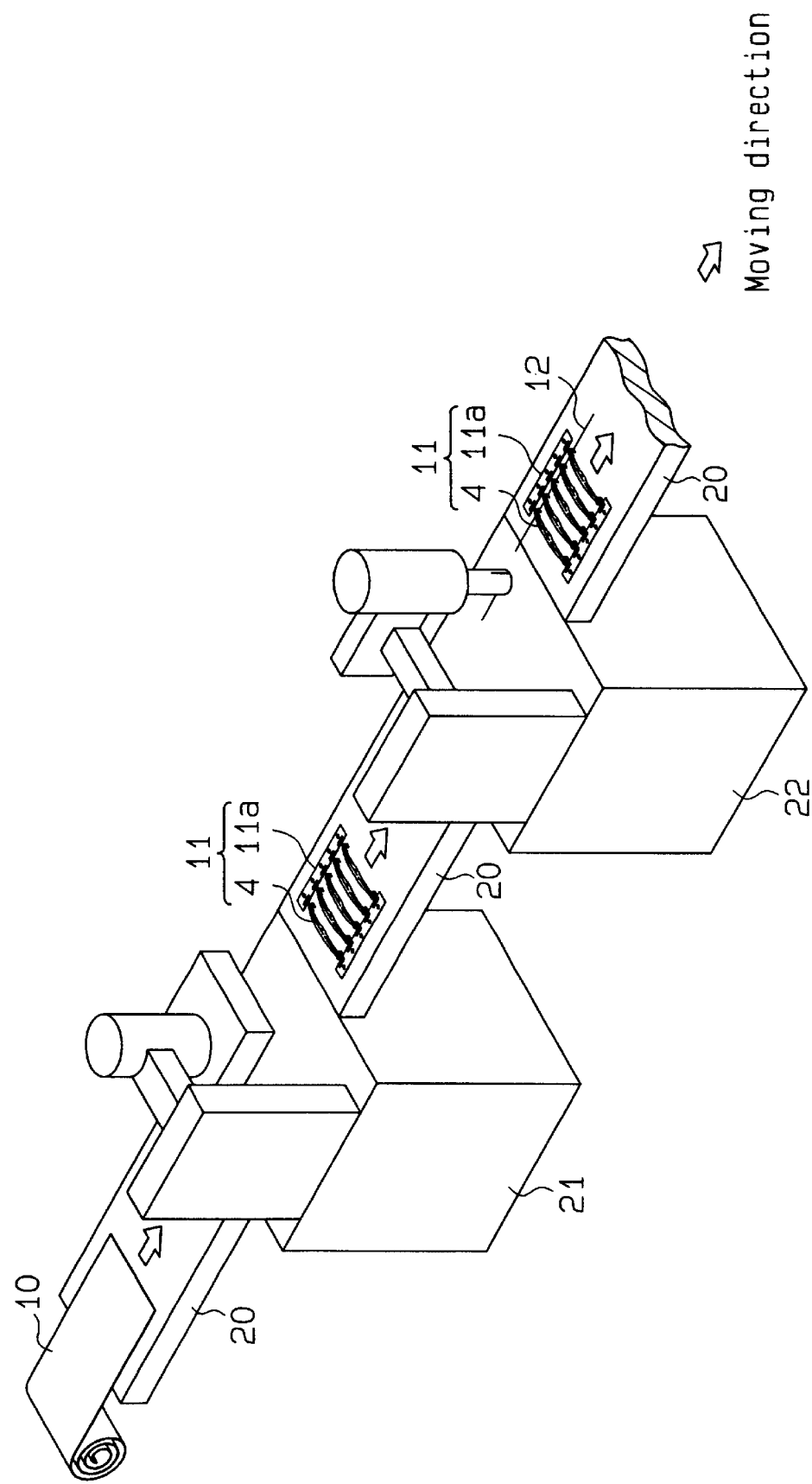
FIG. 3 is a perspective view illustrating a pressing step and a wire feeding step in a process of forming the levers of the wiper blade shown in FIGS. 1 and 2.
Figure 7:
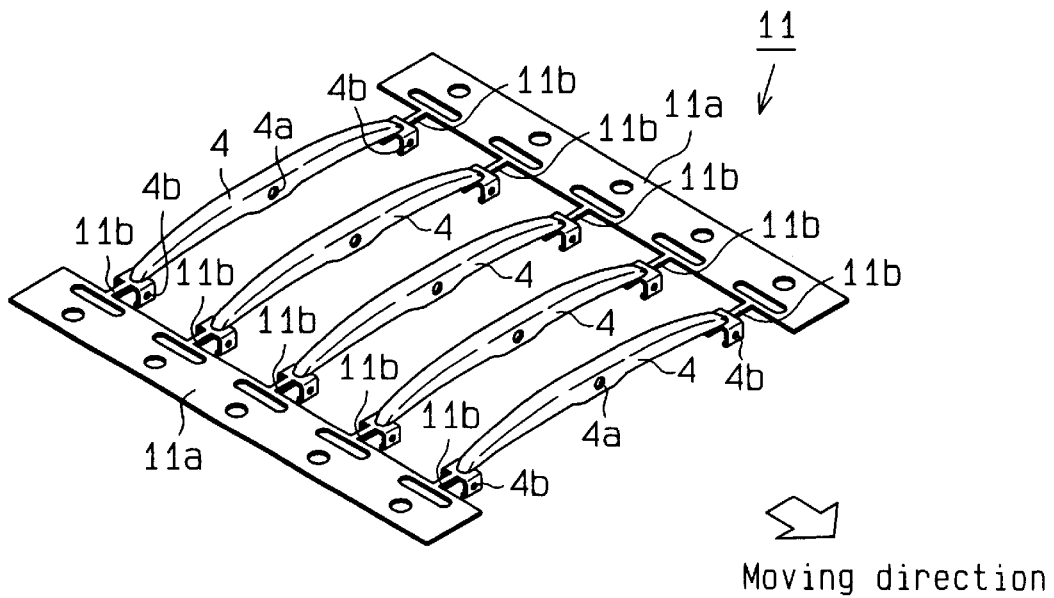
FIG. 7 is a perspective view illustrating the levers of the blade shown in FIG. 1 after pressing.

The pressing step will now be described. As shown in FIG. 3, a metal sheet 10 is fed from a roll to a pressing station, which is a pressing device 21 in this embodiment, by a conveyer 20. The pressing device 21 cuts the metal sheet 10 to a predetermined length and presses the sheet into an integral lever unit 11. The lever unit 11 includes the yoke levers 4, the number of which is five in this embodiment, and coupler frames, which are frame bars 11a in this embodiment. As shown in FIG. 7b, the yoke levers 4 are connected to the frame bars 11a by tabs 11b. The yoke levers 4 are equally spaced apart and are perpendicular to the moving direction, which is shown by arrows in the drawings. The sleeve holes 4b are formed in the sleeves of the levers 4 in the pressing step.

As shown in FIG. 3, the integral lever unit 11 is conveyed to a wire feeding station, which is a wire feeding device 22 in this embodiment.

The hanging unit forming step includes a wire feeding step, a spacer forming step and a separating step.

Figure 4:
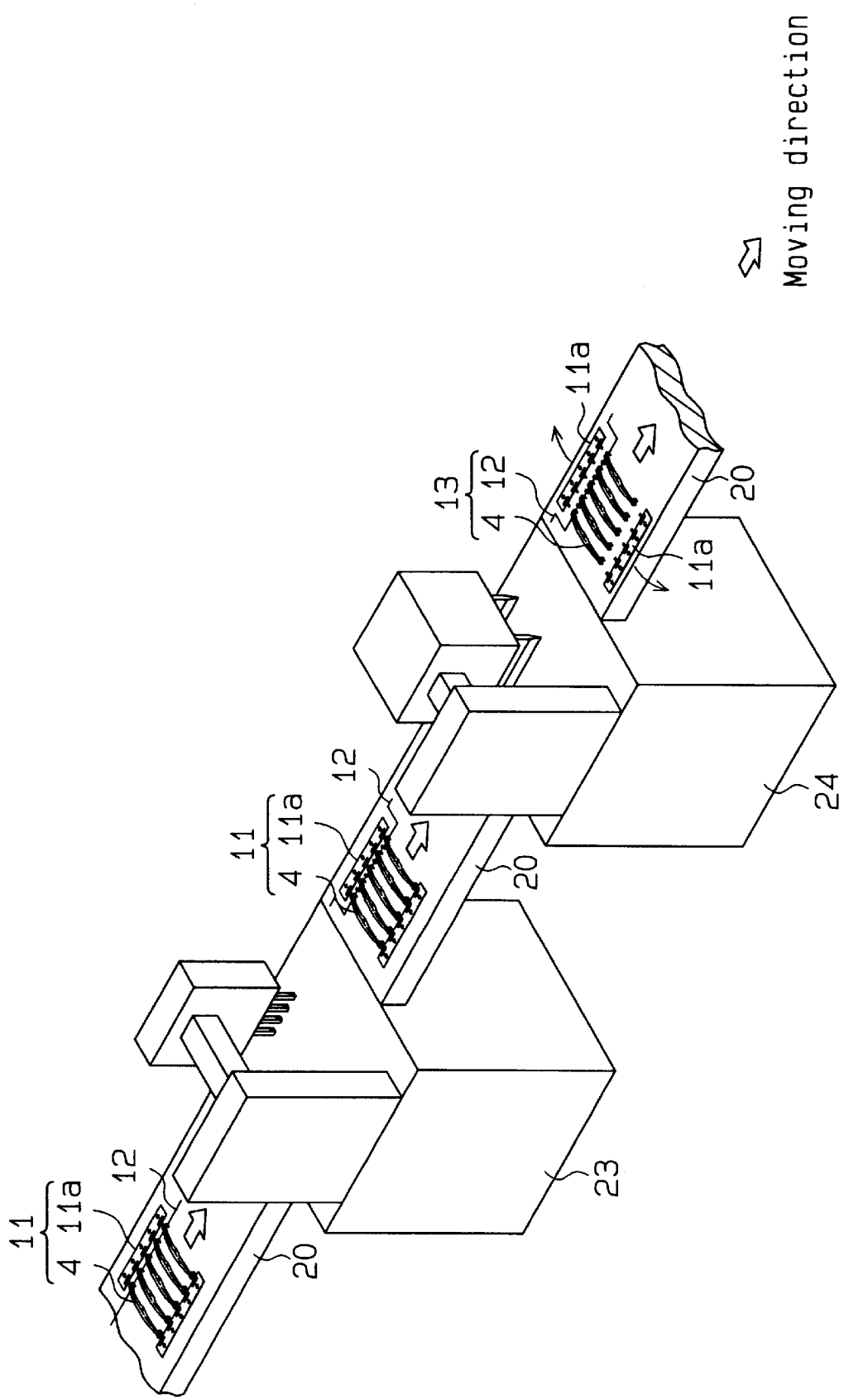
FIG. 4 is a perspective view illustrating a spacer forming step and a step of separating the levers of the wiper blade shown in FIGS. 1 and 2.
Figure 8:
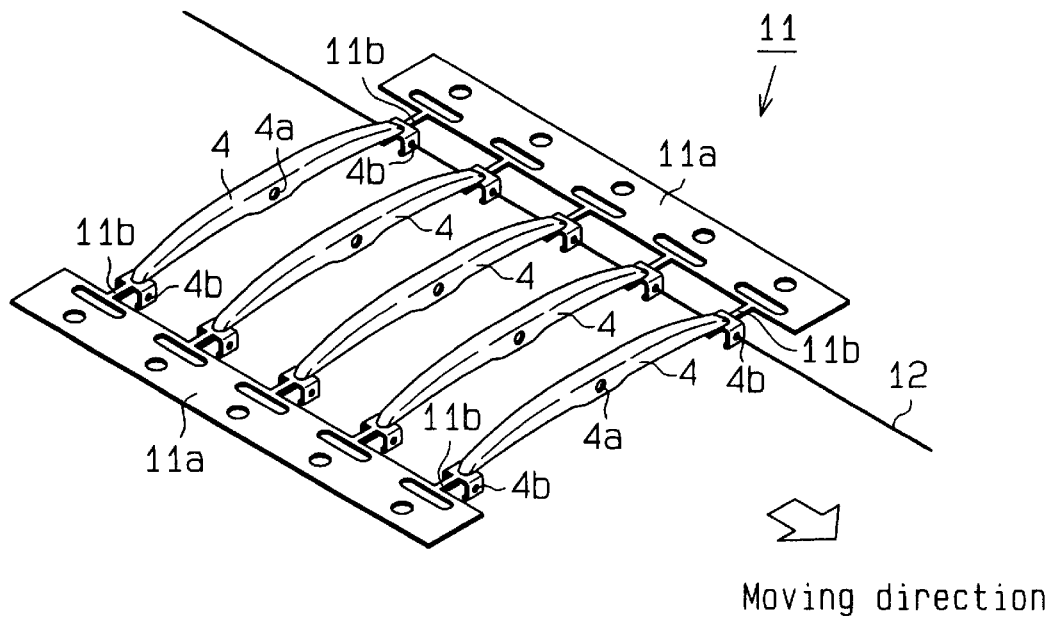
FIG. 8 is a perspective view illustrating the levers of the blade shown in FIG. 1 after a wire is passed through holes in the levers.

In the wire feeding step, the wire feeding device 22 feeds a wire 12 through the sleeve holes 4b on one end of the yoke levers 4, or the integral lever unit 11, as shown in FIGS. 3 and 8. The wire 12 is made of a conductive material such as metal. The length of the wire 12 is longer than the lever unit 11. The diameter of the wire 12 is smaller than that of the sleeve holes 4b. That is, there is radial play between the wire 12 and each sleeve hole 4b. Since the holes 4b are coaxial and the axis of the holes 4b is parallel to the moving direction of the lever unit 11, it is easy to feed the wire 12 through the holes 4b. Thus, the wire 12 occupies the holes 4b of the yoke levers 4, as shown in FIG. 8. As shown in FIGS. 3 and 4, the lever unit 11 with the wire 12 is moved to a spacer forming station, which is a spacer forming device 23 in this embodiment, by the conveyer 20.

Figure 9:
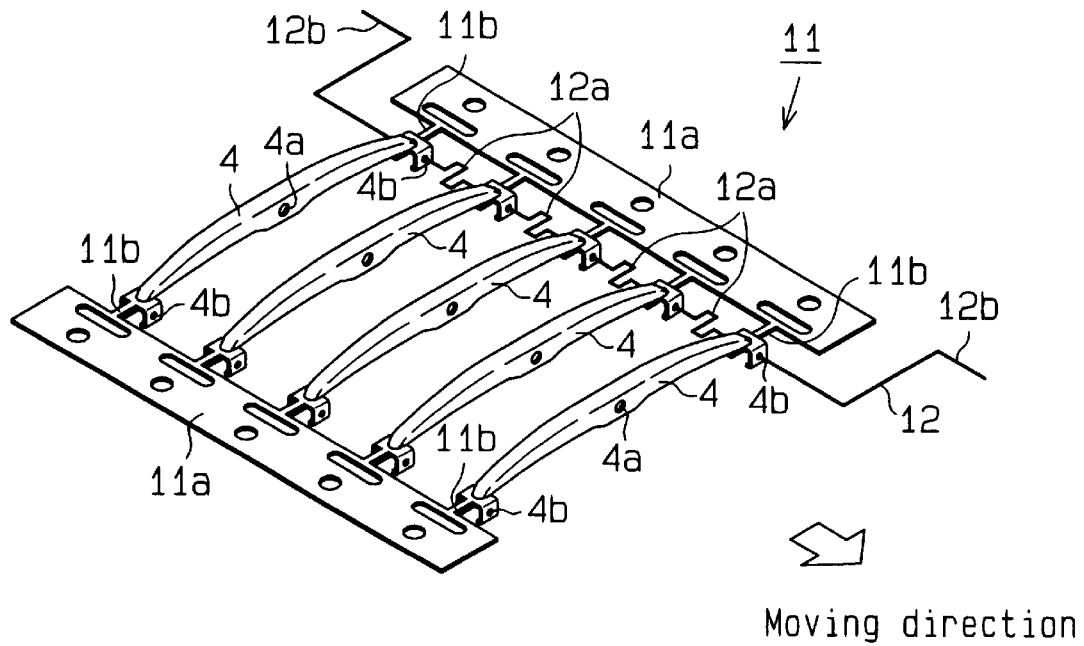
FIG. 9 is a perspective view illustrating the levers of the blade shown in FIG. 1 after spacers are formed in the wire.

As shown in FIGS. 4 and 9, the spacer forming device 23 bends the wire 12 such that a crank shaped spacer 12a is formed between each adjacent pair of the yoke levers 4. Hooks 12b are formed on both ends of the wire 12. The lever unit 11 is then moved to a separating station, which is a separating device 24 in this embodiment, by the conveyer 20.

Figure 10:
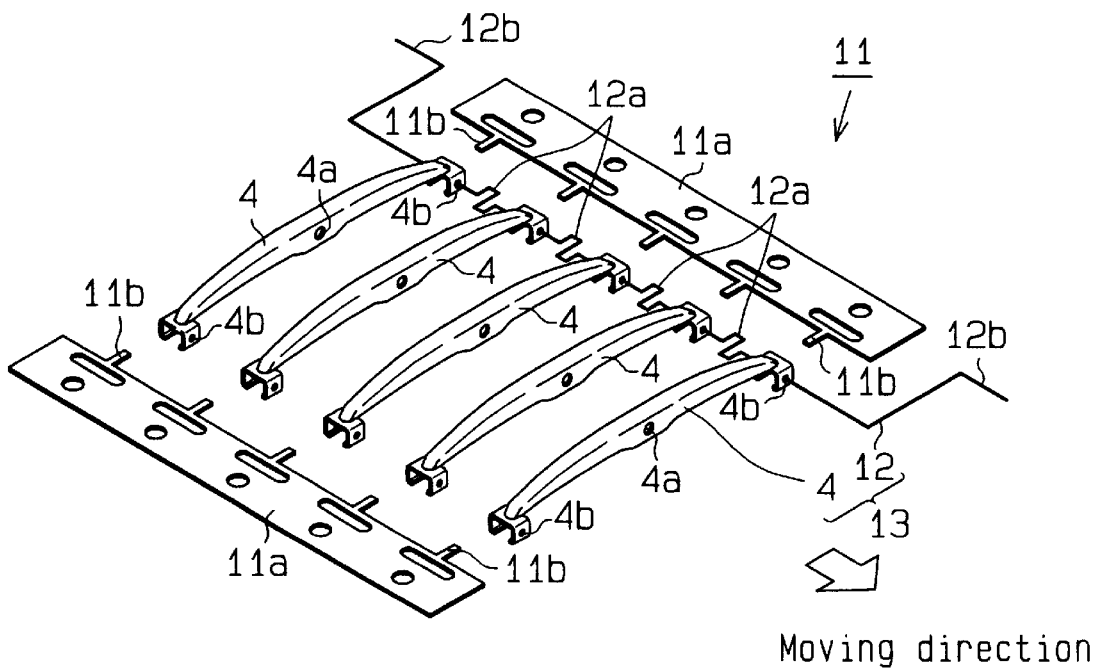
FIG. 10 is a perspective view illustrating the levers of the blade shown in FIG. 1 after the frame bars are removed.

In the separating step, the tabs 11b of the lever unit 11 are broken by the separating device 24, as shown in FIGS. 4 and 10, which separates the yoke levers 4 from the frame bars 11a. The separated frame bars 11a are thrown away. Then, the yoke levers 4 and the wire 12 form a hanging unit 13. The hanging unit 13 is moved to a coating station, which is a coating device 25 in this embodiment, by the conveyer 20 as shown in FIG. 5.

Figure 5:
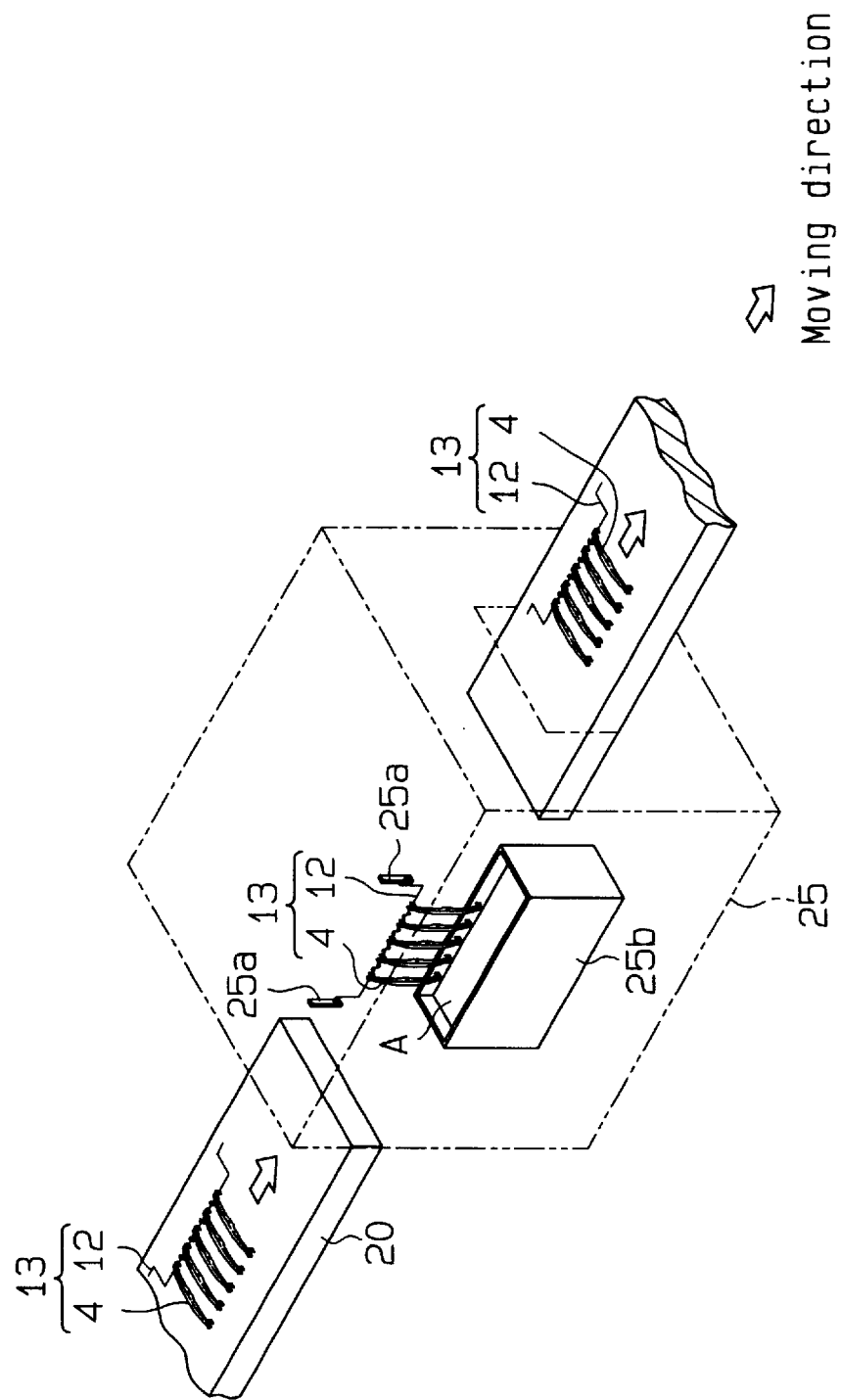
FIG. 5 is a perspective view illustrating a step of coating the levers of the wiper blade shown in FIGS. 1 and 2.
Figure 11:
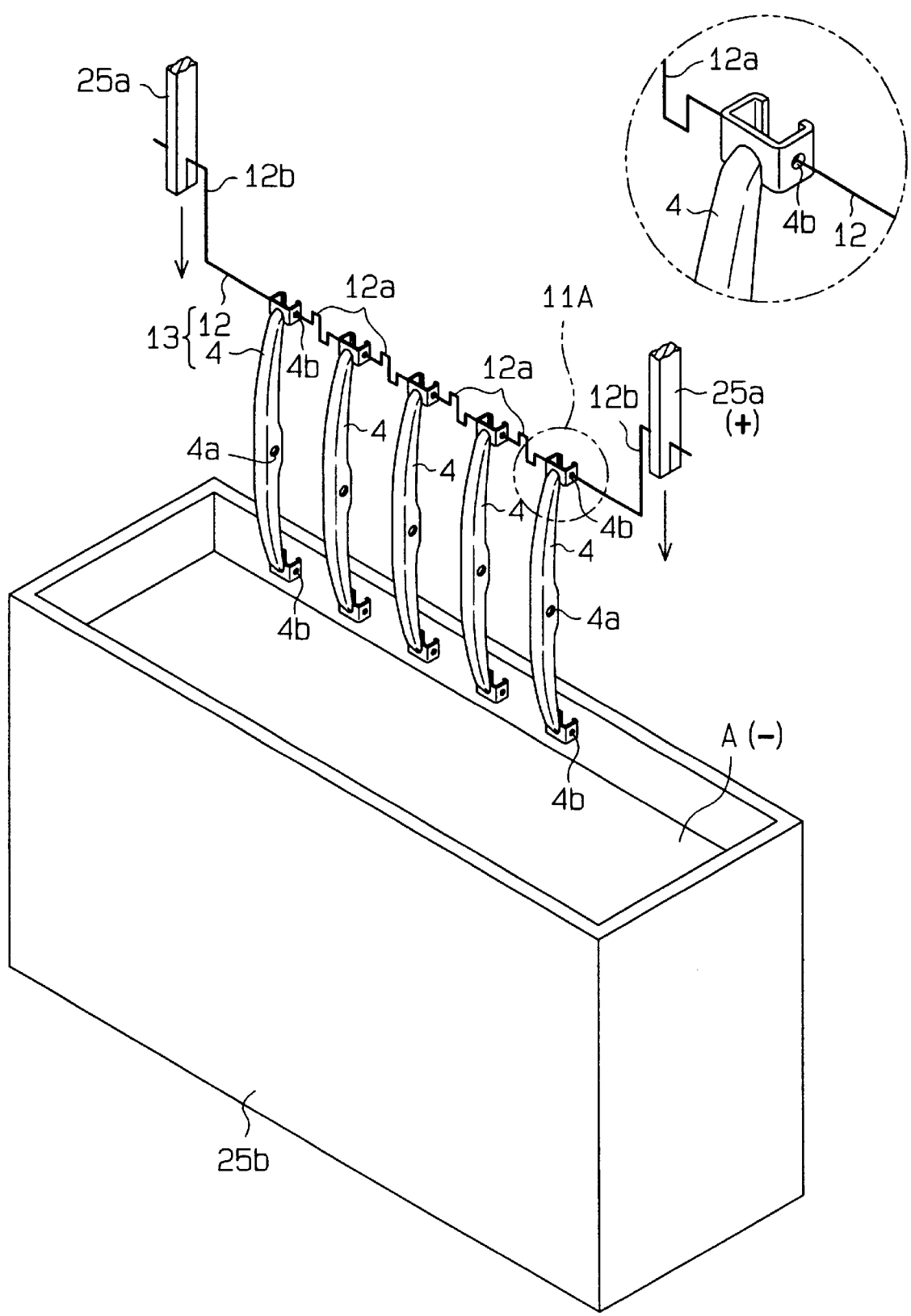
FIG. 11 is a perspective view illustrating the levers of the blade shown in FIG. 1 in a coating step.
Figure 12:
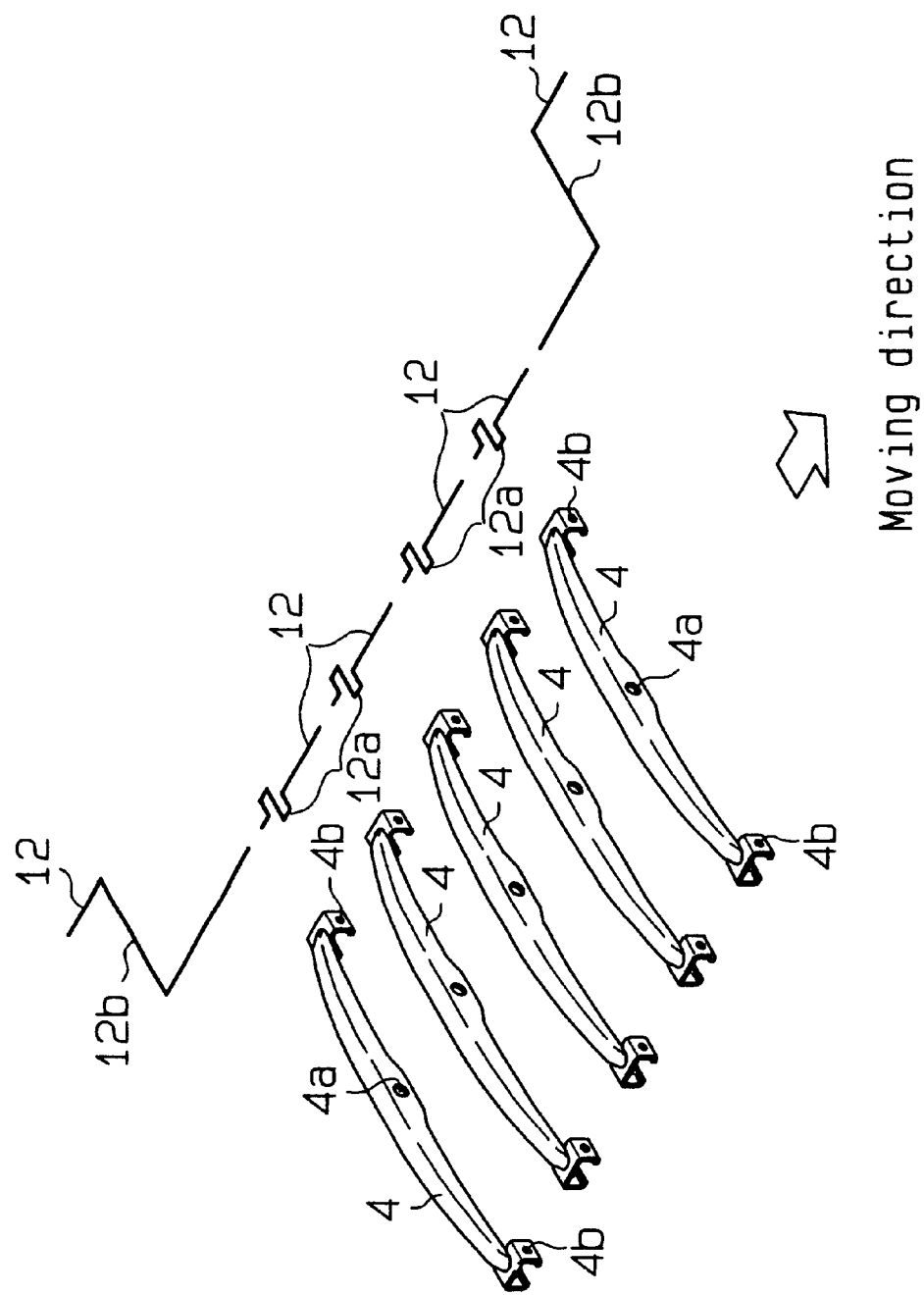
FIG. 12 is a perspective view illustrating the levers of the blade shown in FIG. 1 after the wire is removed.

As shown in FIGS. 5 and 11, the hooks 12b of the wire 12 are held by arms 25a of the coating device 25 and lifted. Accordingly, the yoke levers 4 are hung. The spacers 12a of the wire 12 form a predetermined space between each adjacent pair of the yoke levers 4 and prevents the yoke levers 4 from contacting each other. The yoke levers 4 are electrically connected to the arms 25a by the wire 12.

The hanging unit 13 is moved to a tank 25b that is filled with paint A by the arms 25a. The hanging unit 13 is lowered such that yoke levers 4 and the wire 12, except for the hooks 12b, are immersed in the paint A. That is, the arms 25a are prevented from contacting the paint A.

The yoke levers 4 are subjected to conventional electrodeposition. Specifically, the positive electrode of a direct voltage is applied to the holder arms 25a (the yoke levers 4), and the negative electrode of the direct voltage is applied to the paint A in the tank 25b. Accordingly, the surfaces of the yoke levers 4 are evenly coated with the paint A due to electrophoresis.

As shown in FIG. 11, the spacers 12a prevent the yoke levers 4 from contacting one another, which permits the entire surface of each lever 4 to be coated with the paint A. Since there is play between the wire 12 and each sleeve hole 4b, the yoke levers 4 separate from the wire 12 in the paint A, which permits the inner surface of the holes 4b, including the portion contacting the wire 12, to be coated with the paint A.

Figure 6:
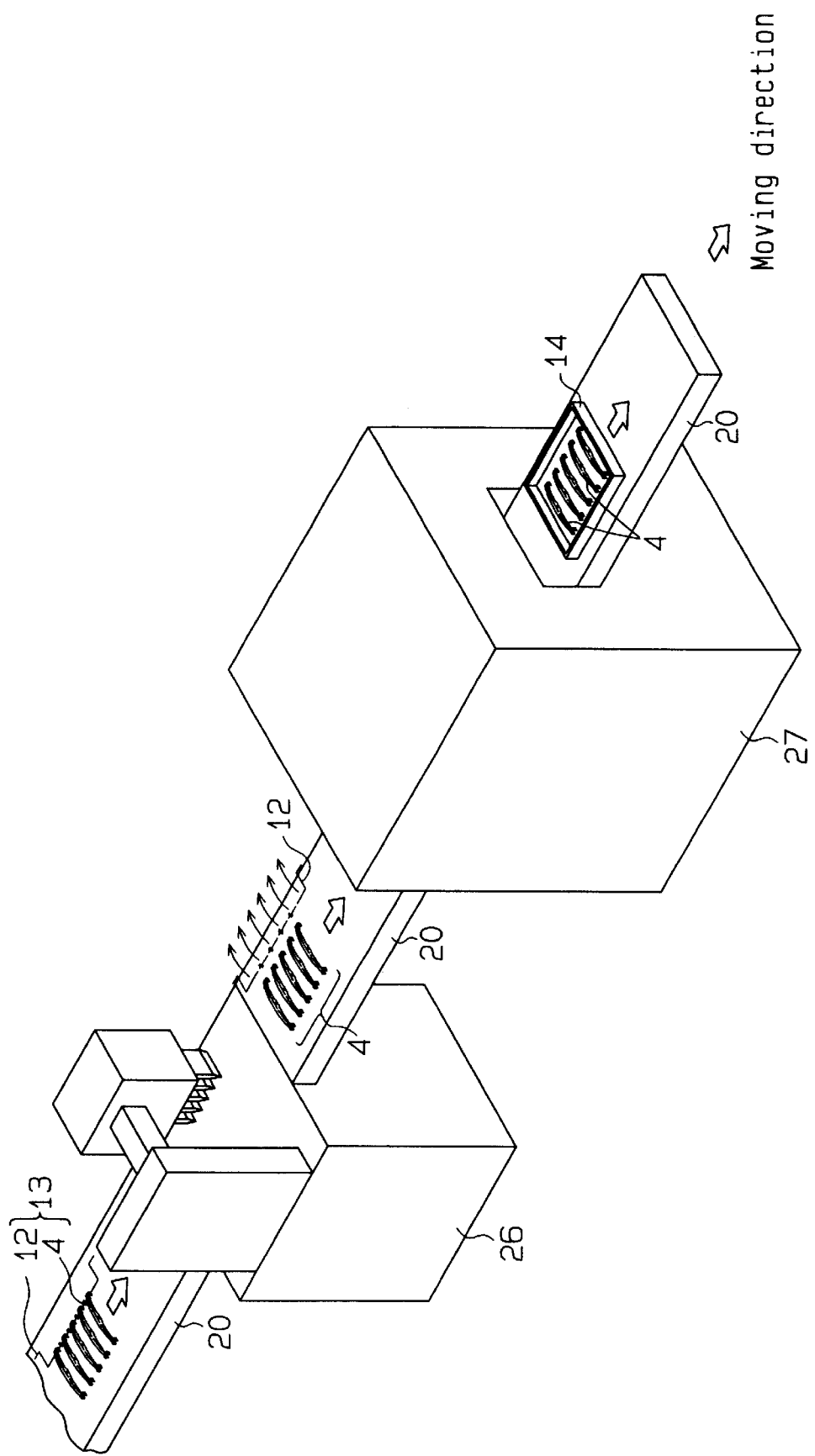
FIG. 6 is a perspective view illustrating a step of removing wire from the levers of the wiper blade shown in FIGS. 1 and 2 and a step of packing the levers.

The hanging unit 13 is immersed in the tank 25b for a predetermined period. Thereafter, the arms 25a pull up the unit 13 from the tank 25b and move the unit 13 to a drying station (not shown) of the coating device 25. The hanging unit 13 is completely dried at the drying station. Then, the hanging unit 13 is moved to a wire removing station, which is a wire removing device 26 in this embodiment, as shown in FIG. 6.

The wire removing device 26 cuts the wire 12 at the sides of the spacers 12a. Then, the wire removing device 26 removes the segments of the wire 12, which extend through the sleeve holes 4b. The removed segments of the wire 12 are thrown away. The yoke levers 4 are moved to a packing station, which is a packing device 27 in this embodiment, by the conveyer 20.

The packing device 27 arranges the yoke levers 4 and places them in a pallet 14.

The illustrated steps are repeated to manufacture a large number of the yoke levers 4. The primary levers 2 and the secondary levers 3 are manufactured in the same way. When manufacturing the primary levers 2 and the secondary levers 3, the wires 12 are fed through the primary pivot holes 2b and the secondary pivot holes 3b at one end of the respective levers 2, 3.

The pallets 14 carrying the levers 2, 3, 4 are moved to a conventional lever assembling device (not shown). The manufacturing device produces the lever assemblies 5 using the levers 2, 3, 4.

The illustrated embodiment has the following advantages.

The wire 12 is fed through the sleeve holes 4b, the primary pivot holes 2b, the secondary pivot holes 3b at one end of the yoke levers 4, the primary levers 2, and the secondary levers 3, respectively, which are integrated by the frame bars 11a (see FIG. 8). Then, the levers 2, 3, 4 are separated from the frame bars 11a to form the hanging unit 13 (see FIG. 10). Compared to the prior art method, where levers are coupled to coupling loops one by one, the illustrated embodiment is more efficient.

The wire 12 is fed through the holes 2b, 3b, 4b at one end of the levers 2, 3, 4 to form the hanging unit 13, which prevents the levers 2, 3, 4 from falling off the wire 12 when the hanging unit 13 is being carried and being coated.

In the coating step, the levers 2, 3, 4 are electrically charged through the wire 12 and are subjected to electrodeposition. Therefore, the levers 2, 3, 4 are evenly coated with the paint A. Compared to electrostatic painting, in which the levers 2, 3, 4 are also charged, electrodeposition requires lower voltage, which reduces the size and the cost of the coating device 25.

There is play between the wire 12 and corresponding holes 2b, 3b, 4b of the levers 2, 3, 4. Therefore, the inner surface of the holes 2b, 3b, 4b is sufficiently coated with the paint A.

The frame bars 11a are separated from the levers 2, 3, 4 before the levers 2, 3, 4 are coated, which permits the cut sections of the levers 2, 3, 4 to be thoroughly coated with the paint A. If the frame bars 11a are separated after the levers 2, 3, 4 are coated with the paint A, the metal exposed by the removal of the frame bars 11a must be coated afterwards. The illustrated embodiment does not require such double coating, which reduces number of manufacturing steps.

After coating the levers 2, 3, 4, the used wire 12 is thrown away each time and a new wire 12 is used for forming the subsequent set of levers 2, 3, 4, which permits the levers 2, 3, 4 to be properly electrically connected to the wire 12 in each sets of the steps. If the wire 12 is not cut in the wire removing step and, instead, the spacers 12a are straightened again so that the wire 12 can be reused, the paint A on the wire 12 may hinder the electrical connection between the lever 2, 3, 4 and the wire 12. This will hinder electrodeposition. Thus, before the wire 12 can be reused, the paint A must be removed from the wire 12, which complicates the manufacture. However, in the illustrated embodiment, since the wire 12 is thrown away after each coating and a new wire 12 is used for each set of the steps, the wire 12 and the levers 2, 3, 4 are properly electrically connected, which results in effective electrodeposition. Also, the method does not require removal of the paint A from the wire 12, which reduces the manufacturing steps.

The wire 12 is relatively inexpensive, which reduces the manufacturing cost.

The spacers 12a, which are formed between each adjacent pair of the levers 2, 3, 4, prevent the levers 2, 3, 4 from contacting one another. Thus, the entire surface of each lever 2, 3, 4 is coated with the paint A.

The spacers 12a are formed by bending the wire 12. The spacers 12a are easily formed without any additional parts.

The lever assembly 5 is formed by coupling the levers 2, 3, 4 by rivets 7. In the illustrated embodiment, the primary pivot holes 2b and the secondary pivot hole 3b of the levers 2 and 3, into which the rivets 7 are inserted, are used for feeding the wire 12 through the levers 2, 3. Therefore, no additional holes need be formed in the levers 2, 3 for the wire 12.

In the illustrated embodiment, the sleeve holes 4b are formed in the yoke levers 4 for the wire 12. However, the holes 4a, which are formed for receiving the rivets 7, may be used for the wire 12. In this case, the sleeve holes 4b can be omitted.

In the illustrated embodiment, the steps are executed continuously from the pressing step to the packing step, which reduces the time required for manufacturing the levers 2, 3, 4.

It should be apparent to those skilled in the art that the present invention may be embodied in many other specific forms without departing from the spirit or scope of the invention. Particularly, it should be understood that the invention may be embodied in the following forms.

In the illustrated embodiment, the frame bars 11a are separated after the spacers 12a are formed. However, these two steps may be performed at the same time. This will reduce the manufacturing time of the levers 2, 3, 4. Also, the spacer forming device 23 and the separating device 24 may be replaced with a single device that performs the functions of the devices 23 and 24.

In the illustrated embodiment, the levers 2, 3, 4 are coated through electrodeposition. However, the levers 2, 3, 4 may be coated by other methods of painting such as electrostatic painting. In this case, the wire 12 may be made of nonconductive material.

In the illustrated embodiment, the wire 12 is thrown away after each set of steps. However, the cutting of the wire 12 may be omitted in the wire removing step and the spacers 12a may be straightened so that the wire 12 is reused. This reduces the material cost. If the wire 12 is straightened by stroking, the paint A on the wire 12 is removed at the same time.

In the illustrated embodiment, the single wire 12 is used for forming the hanging unit 13. However, two or more wires 12 may be used for forming the hanging unit 13.

In the illustrated embodiment, the spacers 12a are formed by bending the wire 12 into cranks. However, the shape of the spacers 12a is not so limited. Also, parts may be fixed to the wire 12 to function as spacers. Alternatively, segments of the wire 12 may be pressed such that the width of the pressed segments is greater than the diameter of the holes 2b, 3b, 4b to form spacers. Further, if there is no possibility that the levers 2, 3, 4 will contact one another, the spacers 12a and the spacer forming step (the device 23) may be omitted.

In the illustrated embodiment, the primary pivot holes 2b and the secondary pivot hole 3b of the primary and secondary levers 2, 3, which are used for receiving the rivets 7, are used for receiving the wire 12. However, the pivot holes 2a, 3a of the levers 2, 3 may be used for receiving the wire 12. Alternatively, additional holes may be formed in the levers 2, 3 for receiving the wire 12.

In the illustrated embodiment, five levers 4 are formed in the single integral lever unit 11. However, the number of the levers 4 in the lever unit 11 is not limited to five.

In the illustrated embodiment, the lever unit 11 is formed by pressing. However, the lever unit 11 may be formed by other methods such as cutting.

In the illustrated embodiment, each of the devices 21-27 performs one of the steps. However, two or more steps may be performed by a single device. For example, the wire feeding step (the device 22), the spacer forming step (the device 23) and the separating step (the device 24) may be performed by a single device.

The illustrated method is for manufacturing the levers 2, 3, 4 of the lever assembly 5 in the vehicle wiper blade 1. However, the method may be used for manufacturing other types of products.

Therefore, the present examples and embodiments are to be considered as illustrative and not restrictive and the invention is not to be limited to the details given herein, but may be modified within the scope and equivalence of the appended claims.

What is claimed is:

1. A method for manufacturing levers used in lever assemblies of wiper blades, comprising:
    forming a lever unit, wherein the lever unit includes a coupler frame and a plurality of parallel levers integrated with the coupler frame, each lever having a hole;
    feeding a wire through the holes of the levers;
    separating the coupler frame from the levers for forming a hanging unit that includes the wire and the levers hanging from the wire;
    coating the hanging levers with paint; and
    removing the wire from the levers after the paint is dried.

2. The method according to claim 1, wherein each hole is formed to receive a coupling pin during assembly of the lever assembly.

3. The method according to claim 1, further comprising forming a spacer with the wire between each adjacent pair of the levers after the wire is fed through the holes, wherein each spacer prevents the levers of the corresponding pair from contacting one another.

4. The method according to claim 3, wherein the forming of spacer includes bending the wire for forming a spacer between each adjacent pair of the levers.

5. The method according to claim 4, wherein the wire is bent such that a part of the wire is transverse to the axes of the holes of the corresponding levers.

6. The method according to claim 3, wherein the coupler frame is separated from the levers at the same time that a spacer is formed between each adjacent pair of the levers.

7. The method according to claim 1, wherein the coating includes electrifying the levers, which are made of conductive material, by applying voltage to the wire, which is made of conductive material, to perform electrodeposition or electrostatic painting.

8. The method according to claim 1, wherein the feeding of wire includes feeding a wire that has a smaller diameter than that of the holes through the holes such that the levers can move relative to the wire.

9. The method according to claim 1, wherein the lever unit is formed such that the holes are coaxial.

10. The method according to claim 1, wherein, when the levers are coated with paint, the ends of the wire are held for hanging the levers from the wire.

11. A method for manufacturing parts comprising:
    forming a unit of parts, wherein the unit includes a coupler frame and a plurality of parallel parts integrated with the coupler frame, each part having a hole;
    feeding a wire through the holes of the parts;
    separating the coupler frame from the parts for forming a hanging unit that includes the wire and the parts hanging from the wire;
    coating the hanging parts with paint; and
    removing the wire from the parts after the paint is dried.

12. The method according to claim 11, further comprising forming a spacer with the wire between each adjacent pair of the parts after the wire is fed through the holes, wherein each spacer prevents the parts of the corresponding pair from contacting one another.

13. The method according to claim 12, wherein the forming of spacer includes bending the wire for forming a spacer between each adjacent pair of the parts.

14. The method according to claim 11, wherein the coupler frame is separated from the parts at the same time that a spacer is formed between each adjacent pair of the parts.

15. The method according to claim 11, wherein the coating includes electrifying the parts, which are made of conductive material, by applying voltage to the wire, which is made of conductive material, to perform electrodeposition or electrostatic painting.

16. The method according to claim 11, wherein the feeding of wire includes feeding a wire that has a smaller diameter than that of the holes through the holes such that the parts can move relative to the wire.

17. The method according to claim 11, wherein the unit is formed such that the holes are coaxial.

* * * * *